Oct. 29, 1963 W. T. SELSTED 3,108,728

STRIP TRANSPORT APPARATUS

Filed Aug. 1, 1960 2 Sheets-Sheet 1

WALTER T. SELSTED
INVENTOR.

BY Harvey J. Lambert
ATTORNEY

Oct. 29, 1963 W. T. SELSTED 3,108,728

STRIP TRANSPORT APPARATUS

Filed Aug. 1, 1960 2 Sheets-Sheet 2

WALTER T. SELSTED
INVENTOR.

BY Harvey G. Lowhurst
ATTORNEY 3,108,728
Patented Oct. 29, 1963

3,108,728

STRIP TRANSPORT APPARATUS

Walter T. Selsted, Woodside, Calif., assignor to Ampex Corporation, Redwood City, Calif., a corporation of California Filed Aug. 1, 1960, Ser. No. 46,434
9 Claims. (Cl. 226—95)

This invention relates to devices for moving and stopping a movable strip material, and in particular to a magnetic tape transport apparatus.

In presently known magnetic tape transport systems, the tape is usually driven at a substantially constant velocity by means of a capstan, such as a hardened polished roller rotating at a substantially constant speed. A pinch roller associated with the capstan clamps the tape against the capstan so that the tape is driven at the peripheral velocity of the rotating capstan.

Some systems, such as those magnetic tape systems used with computers and other data processing equipment, are required to start and stop the tape very rapidly and precisely. In some systems, the pinch roller type of device is used for starting and stopping. Another type of known magnetic tape apparatus employs a capstan which incorporates a suction means for holding the tape against the capstan so as to move the tape with the capstan. The suction means may include a vacuum or reduced pressure source, which acts upon the tape through a plurality of apertures or slots provided in the surface of the capstan. In such apparatus, however, it is necessary to form a good vacuum seal between the moving members, such as the capstan, and the stationary parts of the vacuum system. For such purposes, relatively complicated and expensive sliding seals are generally required. In addition, good initial contact must be established between the tape and the capstan in order for the vacuum to become quickly effective in holding the tape against the capstan. Systems which use pinch rollers, on the other hand, usually involve high inertia elements which require special mechanisms in order to secure the desired starting and stopping speeds. In addition, the frictional forces which such devices exert against the tape cause wear and, in some instances, breakage of the tape.

It is therefore an object of this invention to provide an improved system for moving and stopping a strip material.

It is another object of this invention to provide a high speed, but relatively simple, magnetic tape transport apparatus.

In accordance with the present invention, a strip material may be controllably moved and stopped through the action of pneumatic control elements cooperating with rotating or stationary members. As applied to magnetic tape transport apparatus, pneumatic pressure may be used to force the tape against a rotating capstan, with the flow of air being controlled by a valve arrangement. Where it is desired to brake the tape, the flow of air may be directed against the tape so as to cause it to engage a stationary member.

In systems in accordance with the invention, high speed starting and stopping of a magnetic tape may be effected through the selective actuation of different pneumatic control elements cooperating with moving or stationary members. Further, the flow of air under pressure may also be used at the magnetic transducers so as to assure uniform and intimate contact between the tape and the transducers.

The invention may be better understood by reference to the following description, taken in conjunction with the accompanying drawing, in which.

Figure 1:
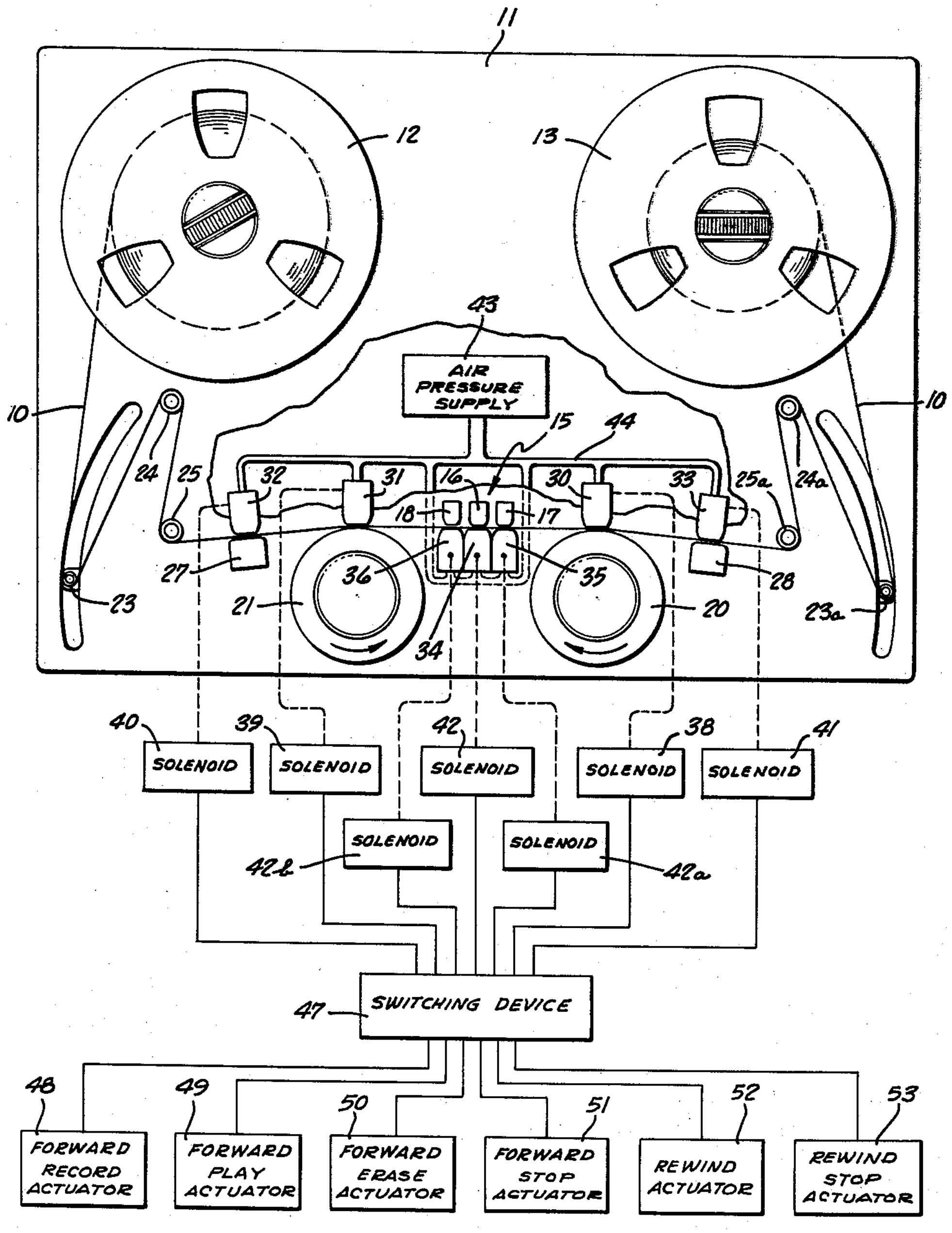
FIGURE 1 is a plan view of a magnetic tape transport apparatus in accordance with the present invention showing portions of the circuits in schematic form.

In FIGURE 1, a transport apparatus is shown in plan view for moving a flexible strip material, such as a magnetic tape 10, as illustrated. The transport apparatus is mounted on a base plate 11 which includes turntables (not shown) for supporting a supply reel 12 and a take-up reel 13. Between the reels 12 and 13 the tape 10 passes a magnetic transducer assembly 15 which includes a recording head 16, a playback head 17 and an erase head 18. Also positioned along the path of movement of the tape 10 between the reels 12 and 13 are a pair of capstans 20 and 21, one of which may be termed a forward capstan 20 and acts during forward "record," "play" or "erase" operation to drive the tape 10 from the supply reel 12 to the take-up reel 13, and the other of which may be termed a rewind capstan 21 and acts to drive the tape 10 in the reverse direction for "rewind."

In operation, the capstans 20, 21 rotate in opposite directions, as shown in FIGURE 1, and the magnetic tape 10 can be driven in either direction between the two reels 12, 13 by selectively clamping the tape to one of the capstans 20, 21. The turntables, capstans and the like are driven by a conventional means at peripheral speeds determined by the speed desired for recording. A pair of compliance arms 23, and 23a are positioned along the path of the tape 10 adjacent the supply and take-up reels 12 and 13 and the tape 10 is looped over two pairs of idlers 24 and 24a and 25 and 25a to form a pair of "slack loops" for high-speed operation. Means may also be provided, in accordance with conventional practice, for applying suitable braking power to the reel from which tape is being withdrawn so that, in conjunction with the compliance arms 23, 23a the tape tension is maintained substantially constant during operation.

In addition, the members which may selectively act upon the magnetic tape 10 include a pair of stationary braking elements 27 and 28, with a forward braking element 27 being positioned between the rewind capstan 21 and the supply reel 12, and a rewind braking element 28 being positioned between the forward capstan 20 and the take-up reel 13.

In accordance with the present invention, a group of control elements 30 to 36 cooperate with the capstans 20, 21 and the braking elements 27, 28 to effect starting and stopping of the tape in desired directions and at high speed. A forward drive control element 30 is positioned in close relationship to the forward capstan 20, on the opposite side from the tape 10, so as to act to clamp the tape 10 against the forward capstan 20. In like manner, a rewind drive control element 31 is positioned adjacent the rewind capstan 21, and forward and rewind brake control elements 32 and 33, respectively, are positioned adjacent the forward and rewind stationary braking elements 27 and 28, respectively. Control elements 34, 35 and 36 are also positioned opposite the transducer assembly heads 16, 17 and 18. Each of the control elements 30 to 36 is adjacent a drive, head or brake element is arranged to be selectively actuated in response to an electrical control signal. Solenoids 38 to 42*b* are employed to actuate each of the different control elements 30 to 36. As is described in more detail below, the control elements 30 to 36 are pneumatic devices, and operate to control the flow of air from an air pressure supply 43 which is coupled to each of the control elements 30 to 36 through a piping or tubing system 44. Any suitable gas other than air may also be employed. Each of the control elements is spaced apart from the capstan, head or braking element with which it cooperates, so as to define a gap 45 within which the tape 10 may be received.

Control signals are applied to the solenoids 38 to 42*b* from a switching device 47 which receives the signals which control the moving or stopping of the tape 10 in the forward or rewind directions. Although in computing equipment these start and stop signals will usually be generated as a part of the data processing function, separate actuators 48 to 53 have here been indicated as initiating the forward record, forward play, forward erase, forward stop, rewind start and rewind stop signals, respectively. The actuators 48 to 53 should be understood to include both automatic and operator controlled signal sources.

In the operation of the system of FIGURE 1, the air pressure supply 43 maintains a high static pressure at the control elements 30 to 36. During forward operation, the appropriate control element 34–36 is selected by the switching device 47 upon actuation of the appropriate actuator 48–50, so that the selected control element provides a constant air flow directed against the tape 10 and the corresponding head 16–18. Therefore, the tape 10 is kept in a uniform and intimate contact with the head, thereby providing improved recording. Also, when the tape 10 is to be driven in the forward direction, the signal from the selected actuator 48–50 is coupled through the switching device so as to operate the solenoid 38 and the forward drive control element 30. The tape 10 is clamped against the forward capstan 20 and is rapidly brought to the constant forward speed which is desired. When the forward motion is to be stopped, a signal from the forward stop actuator 51 applied through the switching device 47 to the solenoids 38, 40 and 42–42*b* acts to turn off the forward drive control element 30 together with the selected head control element 34–36, and to actuate the forward brake control element 32. This results in the tape 10 being released from the head and from the forward capstan 20 but clamped rapidly against the forward stationary braking element 27. A signal from the rewind actuator 52, transmitted through the switch 47, causes the solenoid 39 and the rewind drive control element 31 to clamp the tape 10 against the rewind capstan 21, reversing the tape, and at the same time deactuates the solenoid 40 and control element 32. Finally, when the rewind action is to be stopped, a signal from the rewind stop actuator 53 inactivates the solenoid 39 and the rewind drive control element 31 to release the clamping action at the rewind capstan 21 as the solenoid 41 activates the rewind brake control element 33 to clamp the tape 10 against the rewind stationary braking element 28. Upon subsequent operation of any of the forward or rewind actuators 48–50 and 52, whichever of the control elements 32 and 33 was last actuated is reversed in operation to free the tape for movement.

In each of these starting or stopping actions, the compliance arms 23, 23*a* act to take up slack or to reduce intermittent tensions on the tape 10 which may result from the capstans and braking elements starting or stopping the tape faster than the relatively slower acting supply and take-up reels 12 and 13. It will be recognized, however, that other systems for providing compliance or freedom of tape motion, such as the well known vacuum columns or multiple compliance sections, may be employed if desired. It will be noted that in the braking action, the braking element 27 or 28 acts at a point adjacent to the reel 12 or 13 from which tape 10 is being taken, and in advance of the associated driving capstan 20 or 21. This arrangement ensures faster stopping because it eliminates any tendency of a capstan 20 or 21 to continue driving the tape 10 for some time following the release of the clamping action.

Figure 2:
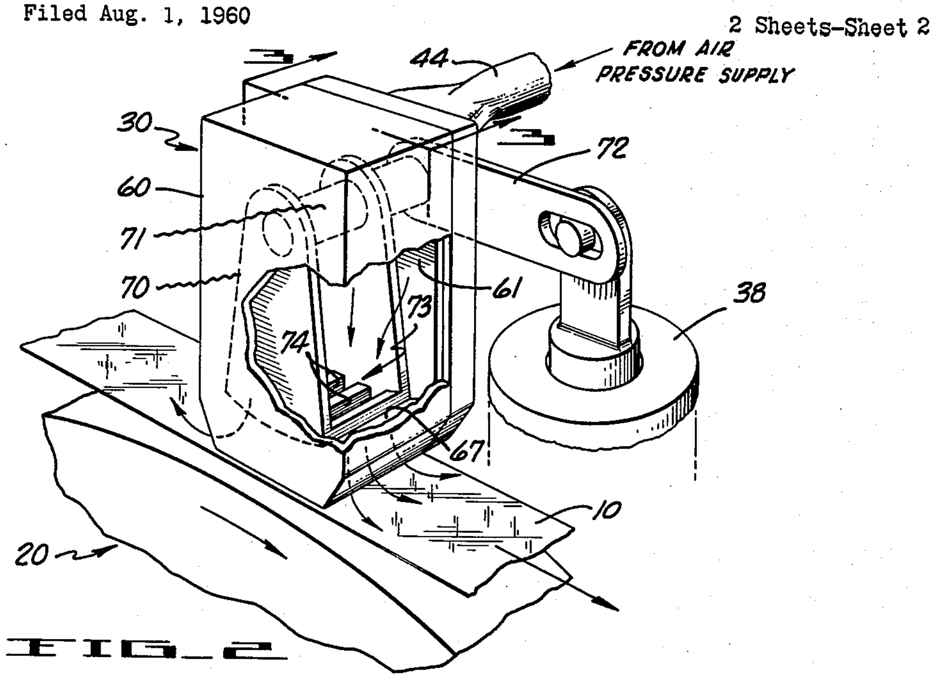
FIGURE 2 is an enlarged perspective view, partially broken away, showing a pneumatic control element in accordance with the present invention.
Figure 3:
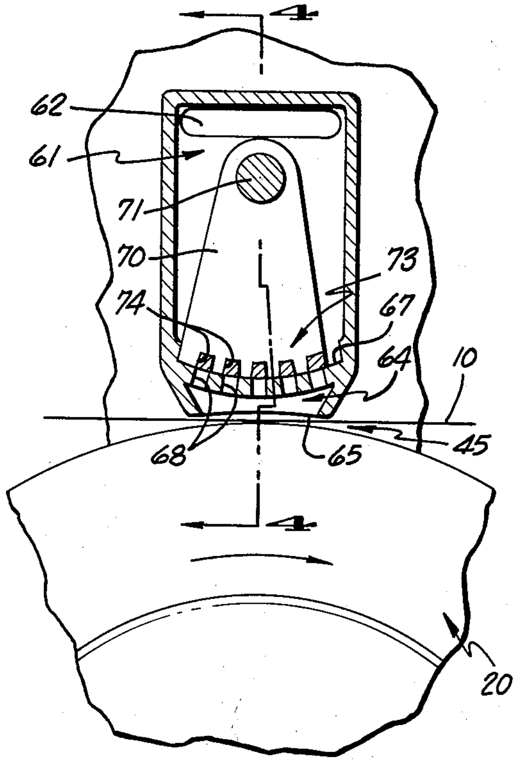
FIGURE 3 is a front sectional view taken along the line 3—3 of FIGURE 2.
Figure 4:
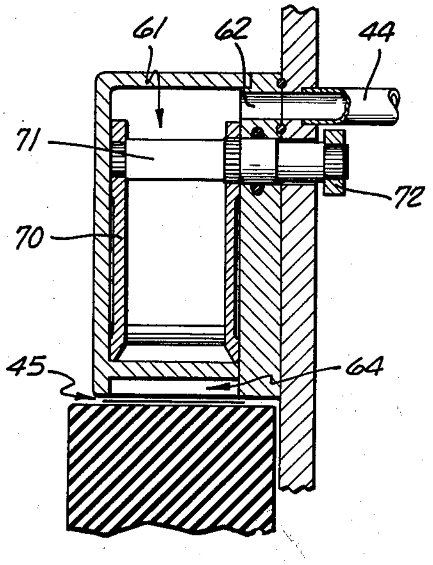
FIGURE 4 is a side sectional view taken along the line 4—4 of FIGURE 3.

Details of the control elements, in accordance with the present invention, may be seen in FIGURES 2, 3 and 4, in which is illustrated in enlarged form the details of the arrangement of the forward drive control element 30, and its relationship to the tape 10 and the forward capstan 20. The control element 30 includes a hollow cylindrical body 60 which is fixed to the base plate 11 in spaced-apart relation to the capstan 20 with which it is to cooperate. The tape 10 passes through gap 45 between the control element 30 and the capstan 20. The cylindrical body 60 may be considered to be divided into two parts, one of which is a static pressure chamber 61, and the other of which is a tapered nozzle 64. The static pressure chamber 61 includes an inlet aperture 62 which is coupled to the tubing 44 by which air from the pressure supply 43 (not shown in FIGURES 2 to 4) is supplied. The tapered nozzle 64 terminates in an opening which faces the capstan 20 and is defined by a lip 65.

The separate volumes of the static pressure chamber 61 and the tapered nozzle 64 are defined by a curved wall or closure member 67 which is circumferentially disposed about a point in the static pressure chamber 61. The closure member 67 includes apertures 68, here shown as slots transverse to the circumferential direction in which the closure member 67 is curved.

Within the static pressure chamber 61, a movable member 70 is coupled to a pivotally mounted shaft 71 which is coupled to the actuating solenoid 38. The axis about which the shaft 71 may be pivoted coincides with the center of the circumference on which the closure member 67 lies. At the end of the movable member 70 closest to the closure member 67 is positioned a circumferential segment 73 which registers with a sliding fit against the adjacent surface of the closure member 67. The circumferential segment 73 includes apertures 74, here shown as slots which are parallel with the axis about which the movable member 70 is pivoted and which also conform in number, size and spacing to the slots 68 in the fixed closure member 67.

The control element 30 operates to clamp the tape 10 against the forward capstan 20 when desired, through use of a flow of air from the tapered nozzle 64. In a first position of the movable member 70, when the associated solenoid is not actuated, the slots 74 in the circumferential segment 73 of the movable member register with the webs of structural material which define the slots 68 of the closure member 67. The static pressure chamber 61 thus remains closed, maintaining the pressure level established by the air pressure supply, and no differential in pressure exists between the pressure at the tapered nozzle 64 and the external environment. In a second position, however, when the solenoid 38 is actuated, the movable member 70 is pivoted by the shaft 71 which is mechanically coupled, as by linkage arm 72, to the solenoid so that the slots 74 are aligned with the slots 58. Air under pressure almost instantaneously flows through the tapered nozzle 64 and between the lip 65 and the tape 10, clamping the tape 10 against capstan 20 and causing the tape 10 to be driven forward.

In like manner, movable members in the remaining control elements 31 to 36 may be selectively shifted in position, to brake or to rewind the tape 10 as desired. It is preferred that the lip 65 of the tapered nozzle 64 be spaced from the periphery of the forward capstan 20 so that at least 75% of the static pressure in the static pressure chamber 61 appears in the tapered nozzle 64. The actual driving or stopping of the tape 10 is, of course, effected by frictional forces between the tape 10 and the capstan 20 or 21 or braking element 27 or 28 to which it is selectively clamped. In any event, no frictional force of wear of any kind from the engaged capstan assemblies affects the reverse side of the tape 10. In addition, the spacing between the lip 65 and the tape 10 is preferably large enough for the tape to move in a path free of the capstans and the braking elements which are not actuated. Wear exerted by these elements on the recording surface of the tape is thereby minimized.

The response time of tape transport apparatus provided in accordance with the invention is limited only by the time that is required to move a movable member 70 so as to place the slots 74 and 68 in alignment, thus opening the valve and clamping the tape against its cooperating member. The volume of the tapered nozzle 64 is preferably made relatively small in comparison to the static pressure chamber 61, and to the air supply 43, so that pressure builds up within the tapered nozzle 34 almost instantaneously. For example, if the capstans are 1.5 inches in diameter, the volume of the tapered nozzles 34 could be made approximately 1/60 of a cubic inch for a 1/4 inch wide magnetic tape, or approximately 1/10 of a cubic inch for 1 inch wide magnetic tape. The size of the slots 68 and 74 and the leakage between the lip 65 of the nozzle 64 and the tape 10 is taken into consideration so that the air flow in the tapered nozzle 64 provides a desired value of pressure. The sizes of the slots 68 and 74 may also be selected with relation to the speed of movement of the movable member 70 so as to attain a desired build-up rate in the air pressure in the tapered nozzle 64, and a selected speed of response.

Instead of being formed as slots, the apertures 68 and 74 may be formed as matching square or circular apertures, or by other configurations. Where desired, the area in which the air pressure acts against the tape may be changed from that shown, so that pressure is exerted against either a very small area or a considerably larger area. In either case the pressure exerted by the air flow may be modified somewhat, so as to obtain the desired total amount of frictional force needed for holding the tape in fixed relation to its cooperating member.

Thus there has been described a transport system for flexible strip material which incorporates pneumatic control elements for controllably clamping the flexible material against a moving or stationary member with high speeds of operation, but without significant wear.

What is claimed is:

1. A flexible strip transport apparatus comprising: a rotatable capstan; and control means disposed adjacent the capstan and spaced therefrom to form a gap for receiving the flexible strip, the control means including pressure means for directing an air flow across said gap to clamp the flexible strip against the capstan, and valve gate means mounted closely adjacent the surface of said capstan and directly confronting said capstan for permitting and preventing said air flow and for thereby causing the pressure of said air at said capstan surface to rise and decay with a minimum time delay.

2. A flexible strip transport apparatus as claimed in claim 1, wherein said pressure means includes: a static pressure chamber mounted on and communicating with the side of said valve gate means that is opposite said capstan; and means for supplying and maintaining said air under pressure in said chamber.

3. Apparatus as characterized in claim 1, wherein said capstan and said control means are mounted on opposite sides of a predetermined plane so that said gap is defined to permit a straight line disposition of said strip therethrough out of contact with both said control means and said capstan.

4. In a magnetic tape transport, an apparatus for pressing said tape against a base means, comprising: an air pressure source; a large volume pressure storage chamber coupled to said pressure source, said chamber being provided with a plurality of openings confronting said tape and said base means; means for opening and closing all of said openings at the same time; and a small volume nozzle member extending from said chamber and defining a single pressure-concentrating conduit for the flow of air from said openings to said tape and said base means, the extending end of said nozzle member being open and being spaced from said base means to define a restricted vent for the lateral escape of said air between said nozzle and said base means, said nozzle member being barely large enough to provide substantially uniform pressure at the surface of said tape.

5. Apparatus as described in claim 4, wherein said base means is a tape-driving capstan.

6. A tape transport apparatus as defined in claim 4 wherein the base means comprises a stationary member, so that a tape is braked upon urging toward the base means.

7. In a magnetic trape transport apparatus having a rotatable capstan of predetermined radius and an adjacent magnetic tape to be driven by said capstan, a control element comprising: a hollow body including an inlet aperture at one end of said body; means coupled to the body at the aperture for supplying gas under predetermined relatively high pressure to the body; a tapered nozzle at the other end of the body, the nozzle being adjacent to one side of the tape, and having an aperture facing the tape and spaced from said capstan a predetermined distance, the capstan being adjacent to the other side of said tape; an apertured wall of predetermined curvature transversely disposed within said body between the inlet aperture and the nozzle aperture, the length of said tapered nozzle from said wall to said nozzle aperture being barely sufficient to provide uniform pressure in all portions of said gas at the surface of said capstan when said tape is engaged therewith; a movable member mounted within the body having an apertured portion conforming to the apertured wall and in slidable engagement with the wall; and means coupled to the movable member to move said movable member between first and second positions whereby the gas within the body may be directed against the one side of the tape in the first position and the gas under pressure is blocked from the one side of the tape in the second position.

8. Apparatus as characterized in claim 7, wherein said nozzle and said capstan are spaced to provide substantially planar alignment of said tape therebetween and out of contact with both said nozzle and said capstan.

9. A pneumatic pressure control element for magnetic tape systems comprising: a hollow body including an enclosed chamber and a nozzle section; means for supplying pneumatic pressure to the chamber; a closure member positioned within the body between the chamber and the nozzle section such that the nozzle section has a small volume relative to the chamber and a length barely sufficient to provide uniform pressure in all portions of the air at the tip of said nozzle; the closure member being circumferentially disposed about a selected axis within the chamber and including a first array of slots therein; a movable member mounted within the chamber and pivotally movable around the selected axis, the movable member including a segment adjacent and conforming to the closure member and having a second array of slots therein, the slotted portions of the closure member and the movable member having like configurations and being in frictional contact; and actuating means coupled to the movable member for moving the movable member to a first position thereby aligning the slots in registry to allow the pressure to act external to the nozzle section against a tape, and to a second position whereby the slots are blocked by the structural material of the closure member and segment, thereby sealing the chamber from the nozzle section.

References Cited in the file of this patent

UNITED STATES PATENTS

| | | |
|---|---|---|
| 2,778,634 | Gams et al. | Jan. 22, 1957 |

| | | |
|---|---|---|
| 2,852,253 | Pouliart et al. | Sept. 16, 1958 |
| 2,954,911 | Baumeister et al. | Oct. 4, 1960 |
| 2,962,200 | Pouliart | Nov. 29, 1960 |

FOREIGN PATENTS

| | | |
|---|---|---|
| 3,531 | France | Oct. 8, 1904 |
| 504,044 | Italy | Dec. 9, 1954 |
| 677,882 | Germany | July 5, 1939 |